United States Patent [19]

Buscher et al.

[11] Patent Number: 5,506,893
[45] Date of Patent: Apr. 9, 1996

[54] TELECOMMUNICATION NETWORK ARRANGEMENT FOR PROVIDING REAL TIME ACCESS TO CALL RECORDS

[75] Inventors: Thomas H. Buscher, Chicago; Teresa J. Coutre, Wheaton, both of Ill.; Marianne J. Franklin, Manalapan, N.J.; Brian D. Freeman, Howell, N.J.; Wayne E. Relyea, Middletown, N.J.; Edward N. Shipley, Holmdel, N.J.

[73] Assignee: AT&T Corp., Murray Hill, N.J.

[21] Appl. No.: 346,314

[22] Filed: Nov. 29, 1994

Related U.S. Application Data

[63] Continuation of Ser. No. 19,512, Feb. 19, 1993, abandoned.

[51] Int. Cl.⁶ .................. H04M 15/00; H04M 17/00; H04M 3/00
[52] U.S. Cl. .................. 379/114; 379/111; 379/112; 379/115; 379/121; 379/122; 379/126; 379/127; 379/144; 379/189; 379/197
[58] Field of Search .................. 379/111, 112, 379/114, 115, 121, 122, 126, 127, 201, 207, 189, 197, 144

[56] References Cited

U.S. PATENT DOCUMENTS

| | | | |
|---|---|---|---|
| 4,761,808 | 8/1988 | Howard | 379/112 |
| 4,799,255 | 1/1989 | Billinger | 379/112 |
| 4,811,378 | 3/1989 | Else | 379/189 |
| 4,935,956 | 6/1990 | Hellwarth et al. | 379/114 |
| 4,975,942 | 12/1990 | Zebryk | 379/144 |
| 5,003,584 | 3/1991 | Benyacar | 379/121 |
| 5,048,079 | 9/1991 | Harrington et al. | 379/112 |
| 5,103,475 | 4/1992 | Shuen | 379/112 |
| 5,146,491 | 9/1992 | Silver et al. | 379/114 |
| 5,159,698 | 10/1992 | Harrington et al. | 379/112 |
| 5,163,086 | 11/1992 | Ahearn | 379/144 |
| 5,179,584 | 1/1993 | Tsumura | 379/121 |
| 5,187,710 | 2/1993 | Chau et al. | 379/126 |
| 5,241,586 | 8/1993 | Wilson et al. | 379/112 |
| 5,353,335 | 10/1994 | D'Urso | 379/144 |

*Primary Examiner*—Stephen Chin
*Assistant Examiner*—Vijay Shankar
*Attorney, Agent, or Firm*—Frederick B. Luludis

[57] ABSTRACT

A facility is provided in a telecommunications network so that a record containing details about an associated call may be delivered to a customer in real time during the progression of the call and/or immediately after the call has been terminated.

14 Claims, 6 Drawing Sheets

| STRUCTURE CODE | CALLING CODE | CALLING NUMBER |
| CALLED NUMBER | DESTINATION NUMBER | TIME OF DAY |
| DATE | ANSWER INDICATOR | NULL |
| NULL | ° ° ° ° ° ° | NULL | NULL | 999 |

TELECOMMUNICATION NETWORK ARRANGEMENT FOR PROVIDING REAL TIME ACCESS TO CALL RECORDS

This application is a continuation of application Ser. No. 08/019,512, filed on Feb. 19, 1993, now abandoned.

TECHNICAL FIELD

The invention relates to telephone systems and more particularly relates to the processing of a call record associated with a telephone call.

BACKGROUND OF THE INVENTION

A telephone company typically processes telephone call records periodically, e.g., once a month to generate respective telephone bills. What this means is that the telephone subscriber (in most instances) typically has to wait a month before being advised of the telephone calls that are being charged to the subscriber.

From time-to-time a subscriber may find after reviewing his/her telephone "bill" that a number of calls listed on the bill are improper and is most likely due to another person having access to calling information (e.g., a calling card number) associated with the subscriber. That is, the other person is using such information to fraudulently charge calls to the subscriber.

Currently, a telephone subscriber may subscribe to a service which allows the subscriber to review a call record within a number of hours, e.g., 5, after the associated call has been completed. While this service allows a subscriber to detect sooner the placing of such fraudulent calls, it nevertheless provides a window (5 hours) in which fraudulent calls can occur.

SUMMARY OF THE INVENTION

An advancement in the art of telecommunications is achieved by providing an arrangement which, in accordance with an aspect of the invention, allows a subscriber to access a call record in real time. More particularly, a subscriber may access and review a call record while the associated call is still in progress and/or immediately after the call has been completed. Accordingly, a subscriber does not need to wait an appreciable period of time to review a call record, but may review the record in the interim, i.e., during the call, and/or immediately after the call has been completed.

DETAILED DESCRIPTION

Figure 1:
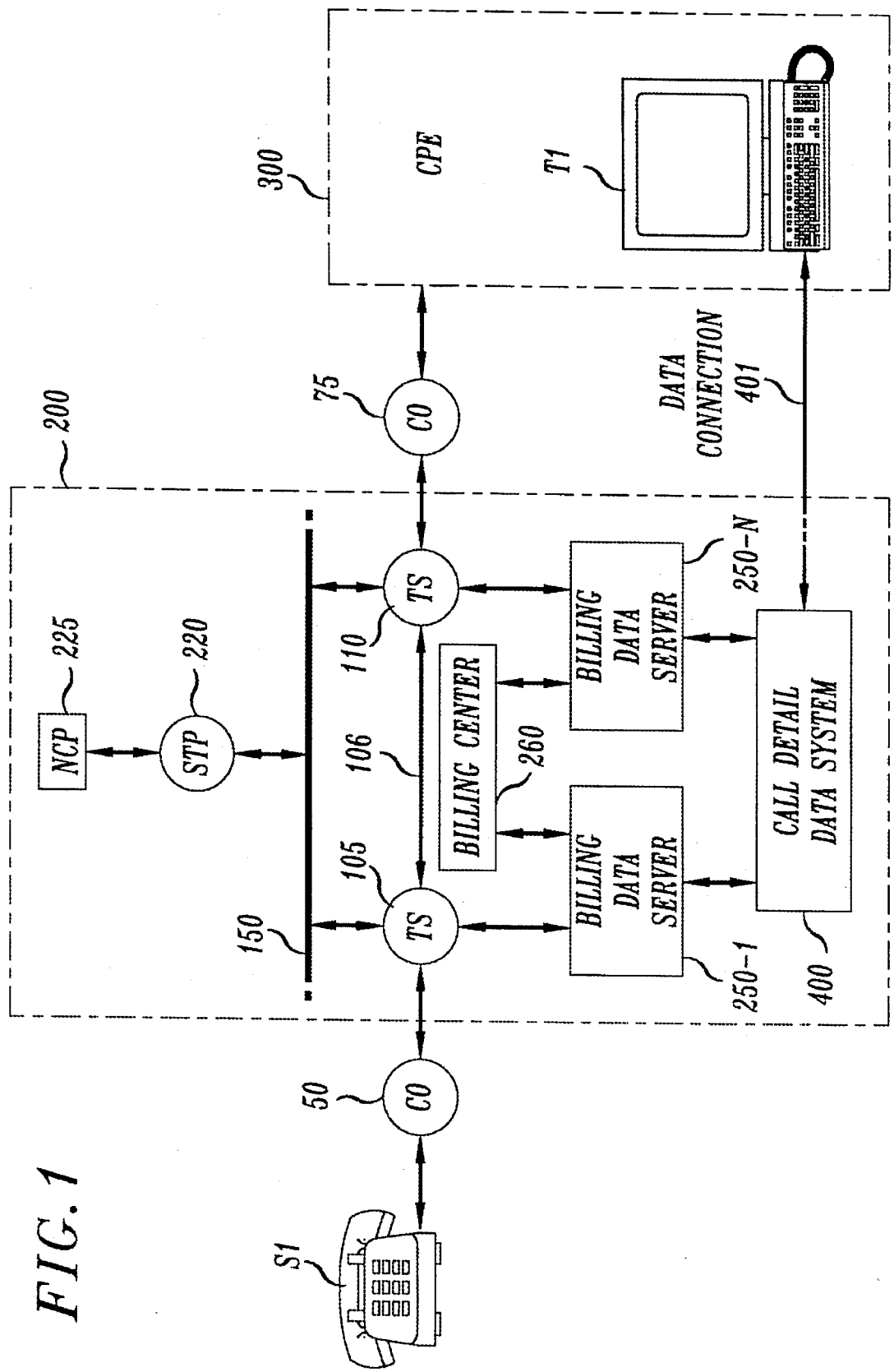
FIG. 1 is block diagram of a telecommunications network in which the principles of the invention may be practiced.

Turning now to FIG. 1, there is shown telecommunications network 200, which may be, for example, the AT&T public switched network, that provides a number of different calling services for its subscribers, e.g., the subscriber associated with station S1 and CPE (Customer Provided Equipment) 300. In the practice of the invention, CPE 300 may include, for example, a conventional Private Branch Exchange.

Network 200 includes, inter alia, a plurality of interconnected Toll Switching (TS) offices, two of which are shown in the FIG., namely TS 105 and 110. Such toll switches may be any one of a number of different well-known types of switching equipment, such as, for example, the No. 4ESS (Electronic Switching System) commercially available from AT&T. Such toll switches are also interconnected via data link 150, which may be a part of, for example, the well-known Common Channel Signaling network (CCS). The toll switches exchange data messages with one another via CCS network 150 in order to establish a telephone connection from an originating toll switch, e.g., TS 105, to a destination toll switch, e.g., TS 110.

Each toll switch, e.g., TS 105 or 110, may also be connected to one of a plurality of Central Offices (CO), such as CO 50 or 75, respectively. A CO is arranged to connect a calling telephone station (e.g., S1) which has dialed a particular telephone number outside of the calling area served by the CO to an associated toll switch, e.g., TS 105. A CO is also arranged to connect calls that it receives from an associated toll switch (destination switch) to a called station, e.g., station S1.

Network 200 further includes a number of centralized databases commonly referred to as Network Control Points (NCP), which are commercially available from AT&T, and which support the provision of various network 200 services, such as, for example, the well-known 800 calling service and Software Defined Network (SDN) service. Such NCPs, for example, NCP 225, are positioned at various locations within network 200 and are interconnected with the toll switches via CCS network 150 and various signal transfer points, such as Signal Transfer Point (STP) 220.

One function of an NCP is to translate a routing query, e.g., a dialed telephone number, that it receives from an originating toll switch, e.g., TS 105, into a destination telephone number specified by the business customer associated with the dialed telephone number. In a typical case, such a dialed number may be, for example, an 800 service telephone number. The NCP, in turn, returns a message containing, inter alia, the destination telephone number to the originating toll switch. The latter toll switch, in turn, generates a routing number as a function of the destination telephone number contained in the NCP message, in which the routing number identifies a destination toll switch, e.g., TS 110. The former toll switch then forwards the call, e.g., 800 service call, as well as associated calling information, such as the called and destination telephone numbers and so-called ANI, to the destination toll switch via the intertoll network (represented by path 106). The destination toll switch, in turn, forwards the call to its intended destination.

In addition, the originating toll switch forms a conventional call record to track the progress of the call and inserts information relating to the call so that a billing center may determine the cost (charges) for the call. Such information includes, inter alia, (a) calling number (i.e., ANI), (b) called number, (c) destination number, if any, and (d) starting date and time for the call. The originating toll switch also inserts the duration of the call in the call record when the call is terminated. At that time the originating toll switch forwards the call record to an associated one of billing data servers 250-1 through 250-N, which in the case of TS 105 would be billing data server 250-1. (In an illustrative embodiment of the invention, a billing data server may be, for example, the Billdats II (registered trademark of AT&T) data collector system available from AT&T.) Thereafter, the billing data server 250 forwards the call record to conventional billing center 260, which then compiles the call records that it received for a respective caller into a "telephone bill". As mentioned above, a telephone bill is typically presented to a caller, or subscriber, on a periodic basis, e.g., monthly.

Since a telephone bill is received on periodic basis, a customer may find it difficult to thwart fraudulent calls charged to the customer's telephone number. The customer may also find it difficult to manage the costs of such telephone calls and the manner in which the customer's telephone facilities are being used.

We address such problems by providing a mechanism which allows a telephone customer to access a call record, in accord with an aspect of the invention, in real time. In addition, the mechanism also allows a telephone customer to access a telephone billing record during the time that an associated call is still in progress.

In particular, if a customer (subscriber) desires to access an associated call record in real time, then we associate a first (CDDS) routing flag in an NCP 225 script for that customer, in which the NCP script contains the destination telephone number that is specified by the customer, as mentioned above. Moreover, if the customer desires to access the call record while the call is in progress, then we also associate a second (interim) flag in the NCP script. Accordingly, then, a customer may, in accord with aspects of the invention, access a call record in real time and while the associated call is still in progress, respectively. (It is noted that the terms "in progress" and "interim," when used in conjunction with a telephone call or associated call record, are taken to mean herein that the associated call has not yet been terminated, i.e., disconnected. In addition, the term "delivering a call record in real time" and variants of that term is taken to mean that a call record is delivered to the pertinent customer when the associated call is in progress immediately after the call has been terminated.)

Specifically, assume that the telephone call discussed above is placed from station S1 to an 800 service number (e.g., 800-555-1234) assigned to CPE 300 and that the above-mentioned routing flags are set in the associated NCP script. Accordingly, the called customer associated with the 800 service number will be allowed to access in real time a copy of the record that is created when a call is placed to that number. Thus, when TS 105 receives the call via CO 50 and thereafter receives the NCP 225 message in response to the aforementioned query, then TS 105 retains the NCP message in memory in association with the aforementioned call record. TS 105 then launches the call toward its destination (i.e., CPE 300 via TS 110 and CO 75). Thereafter, when TS 105 receives an indication from the far-end (destination switch, e.g., TS 110) that the telephone call connection has been completed, then TS 105 notes that fact in the associated call record. In doing so, TS 105 checks to see if the interim flag in the received NCP message is set. If it is, then TS 105 enters in the call record that the call has been connected and also enters a routing indicator (or flag) having a particular value, e.g., 999. However, since the call is in progress, i.e., the call has not yet been disconnected (terminated), TS 105 enters a null value in the duration field of the associated call record. TS 105 then sends the call record to its associated billing data server 250-1. As an aspect of the invention, the originating switch 105 may be arranged so that, in response to the presence of either one of the aforementioned flags, it sends a request via CCS 150 to destination switch 110 requesting information that may be specific to the called customer. Such information may include, for example, the identity of the TS 110 trunk that was used to progress the call to its destination. TS 105, responsive to receipt of the requested information, may then include the information in respective field(s) of the associated call record.

Furthermore, when the call is terminated, toll switch 105 notes that fact in the associated call record, and checks to see if the first (CDDS) flag is set in the NCP message. If it is, then TS 105 enters the fact that the call has been terminated in the call record along with the 999 routing flag. TS 105 then enters the duration of the call in the duration field and sends the call record to its associated billing data server 250-1.

In certain cases, the call may not be answered or the called telephone number may be busy. As such, TS 105 notes that condition and a billing duration of zero in the record. It also inserts the 999 routing flag if the NCP message indicates that the first flag is set. TS 105 then sends the record to billing data server 250-1. Billing data server 250-1, in response to receipt of the record, checks to see if the record contains the aforementioned 999 routing flag. If it does, then billing data server 250-1 sends a copy of the record to Call Detail Data System (CDDS) 400. CDDS 400, in turn, stores the received record in its associated memory. In addition, billing data server 250-1 checks to see if the record contains a null value for the duration. If it does, then billing data server 250-1 considers the call record to be an interim call record and discards the record. If the record contains a duration value, then billing data server 250-1 sends the record to conventional billing center 260 so that it may be processed as mentioned above.

When CDDS 400 receives a call record, it associates the record with a particular customer, e.g., CPE 300, and stores the record in a database associated with that customer. Once a call record has been stored in CDDS 400, then the associated customer, e.g, CPE 300, may obtain a copy of the record. CPE 300, more particularly, includes a particular device, e.g., portable computer, workstation, main frame, generally designated T1 which interfaces with CDDS 400 over datapath 401. The interface includes the steps of "logging onto" CDDS 400 by entering, via device T1, a conventional login and password sequence assigned to CPE 300. When CPE 300, operating through device T1, completes that procedure, it may then access the records stored in the CDDS 400 database associated with the CPE 300 customer.

Figures 2, 3:
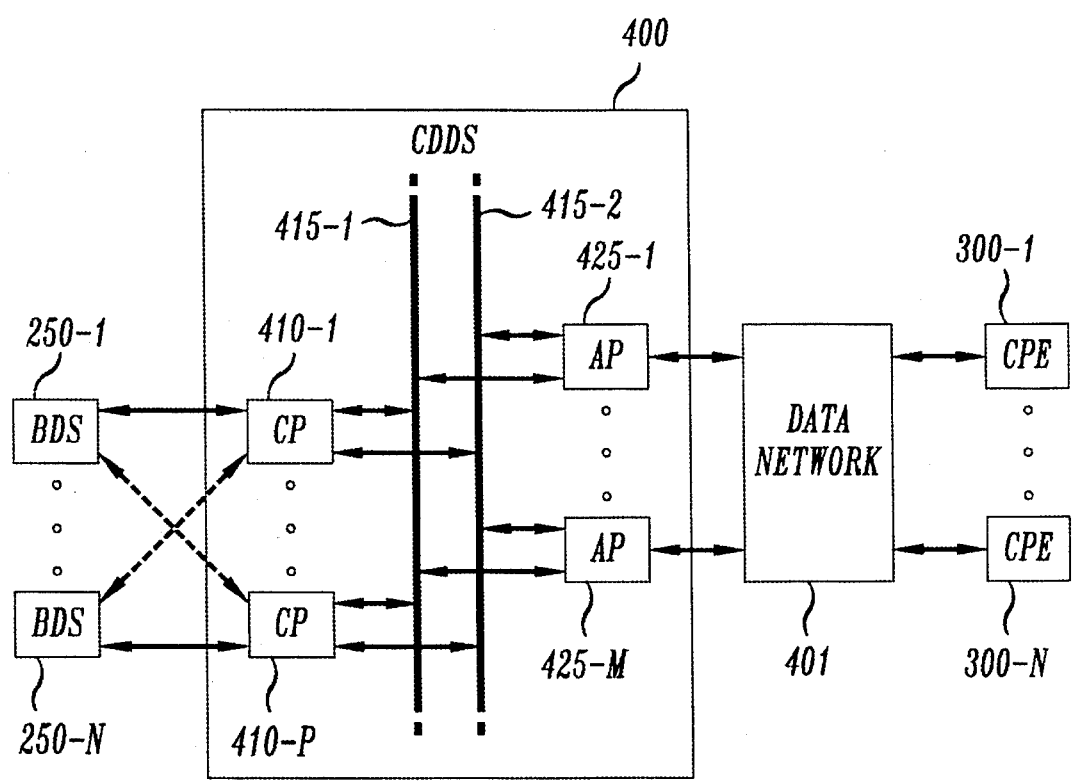
FIG. 2 is an illustrative example of an interim call record.
FIG. 3 is a block diagram of the call detail data system of FIG. 1.

Turning now to FIG. 2, there is shown an example of interim call record 500 that a toll switch, e.g., TS 105, stores in a memory register internal to the switch and then sends the contents of the register as a call record to its associated billing data server. Besides the information discussed above, the call record includes, inter alia, a structure code and calling code. The structure code, more particularly, defines the type of call record, e.g., 800 service, and the calling code defines specific service aspects of the call, e.g., customer defined routing. Since the record is an interim record, particular fields 501 thereof, e.g., call duration, each contain a null word, whereas field 502 contains the 999 routing flag indicating that a copy of the record is to be supplied to CDDS 400. When a call is terminated (i.e., either the calling or called party "hangs up") then TS 105 inserts the duration of the call in field 501-1 and inserts particular details relating to the associated call in the other fields 501. TS 105 then sends the call record to its associated billing data server 250, which then supplies the record to billing center 260 and CDDS 400.

Turning now to FIG. 3, there is shown a block diagram of CDDS 400 in communication with a number of billing data servers 250-1 through 250-N. A CDDS 400 includes a number of Communications Processors 410-1 through 410-P which communicate with the Billing Data Servers (BDS) 250 via respective primary communications paths shown in solid lines. Second communications paths, shown in dashed lines, are also provided in the event that a primary communications path or associated CP 410-1 is unavailable, for whatever reason. A CP 410 operates as a data router for routing a call record that it receives from a billing data server 250 to the appropriate Application Processor (AP) 425 via data network 415. In an illustrative embodiment of the invention, a CP, as well as an AP may be, for example, the StarServer FT processor commercially available from AT&T, and data network 415 may be a duplicated Ethernet network commercially available from the Xerox Corp.

Upon receipt of a data record from a billing data server, e.g., server 250-1, a CP 410, e.g., CP 410-1, determines the type of call that is associated with the record, e.g., 800 (900) service call or a so-called Software Defined Network (SDN) call. Based on that determination, the CP uses either the terminating or originating telephone number, respectively, to identify the associated customer. Armed with the customer identity, the CP then identifies which AP 425 is serving that customer. The CP 410 then routes the record to the identified AP 425 via one of the paths of network 415. The AP 425, in response to receipt of the record, stores the record in a customer specific database internal to the AP 425. A CPE 300 may then communicate with its associated AP 425 via data network 401 in order to access the data record. In an illustrative embodiment of the invention, network 401 may be, for example, the Datakit virtual circuit switch available from AT&T.

Figure 4:
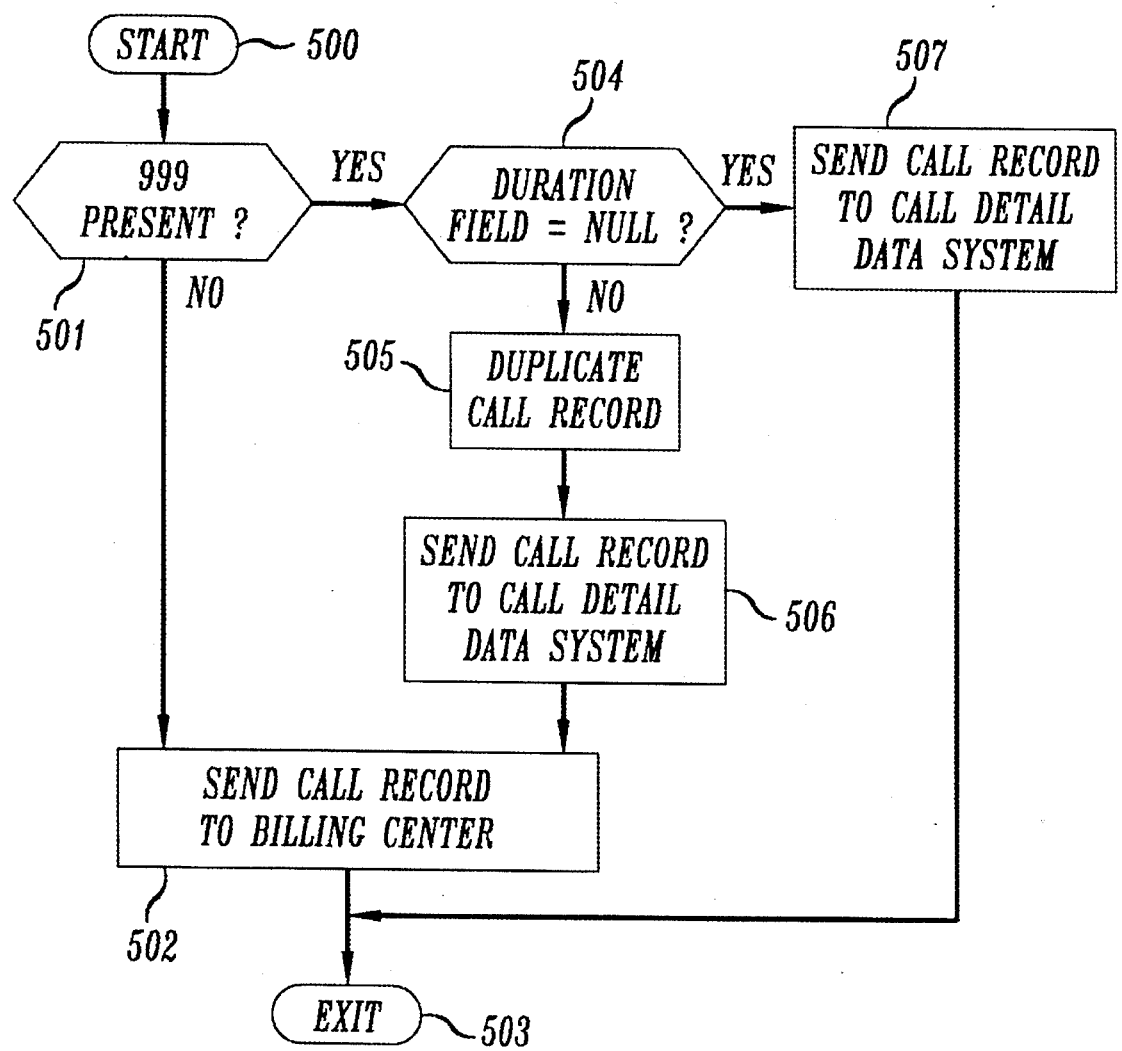
FIGS. 4–8 show, in flow chart form, the programs which implement the invention in respective facilities of the telecommunications network of FIG. 1.

FIG. 4 is a flow chart of the program which implements the invention in a billing data server. In particular, the program is entered at block 500 upon receipt of a call record from an associated toll switch. When entered at block 500, the program proceeds to block 501, where it checks to see if the record contains the 999 routing flag. If the record contains that flag, then the program proceeds to block 504. Otherwise, it proceeds to block 502 where it sends the call record to the billing center and then exits via block 503. At block 504, the program proceeds to block 507 if it finds that the duration field of the record contains a null word. Otherwise, it proceeds to block 505. At block 505, the program makes a duplicate of the call record and then proceeds to block 506 where it sends the duplicate to CDDS 400. The program then proceeds to block 503 where it sends the record to the billing center and then exits. At block 507, the program sends the call record to CDDS 400 and then exits at block 503.

Figure 5:
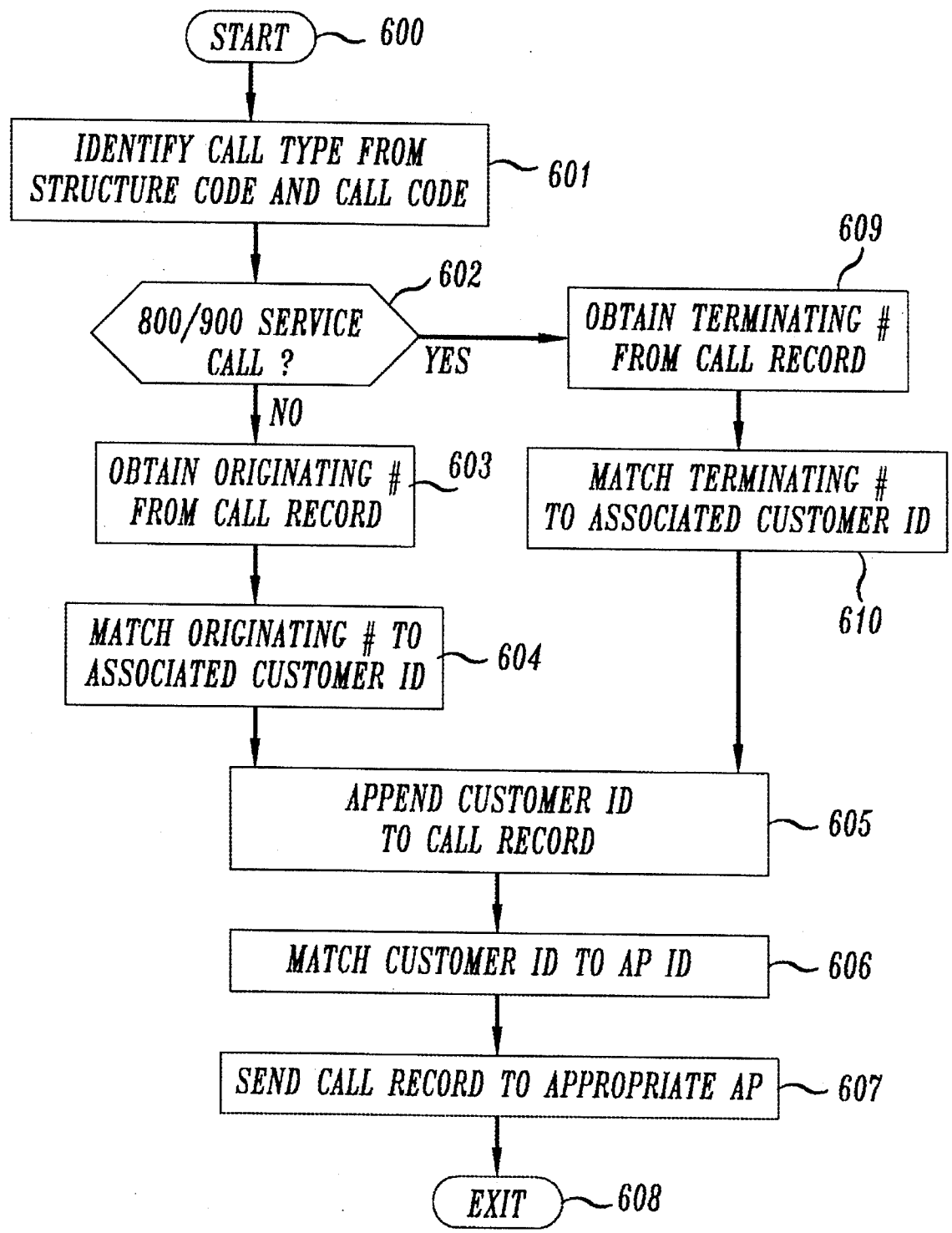

A flow chart of the program which implements the invention in a Communications Processor (CP) is shown in FIG. 5. Specifically, the program is entered at block 600 upon receipt of a call record from a billing data server. At block 600, the program proceeds to block 601 where it identifies the call type as a function of the structure and call codes contained in the received record. The program then proceeds to block 602 where it transfers to block 609 if it finds that the associated call is either a 800 or 900 service call. Otherwise, it proceeds to block 603 where it unloads the calling (originating) telephone number from the record and then proceeds to block 604 where it identifies the customer associated with that number. The program then appends that identity to the call record at block 605 and proceeds to block 606 where it matches the customer's identity (ID) with an Application Processor (AP) 425 serving that customer. The program at block 607 then sends the call record to that AP via one of network paths 415-1 or 415-2. The CP program then exits via block 608. At block 609, the program unloads the terminating telephone number from the received data record and then proceeds to block 610. At block 610, the program determines the customer ID as a function of the terminating telephone number and then proceeds to block 605.

Figure 6:
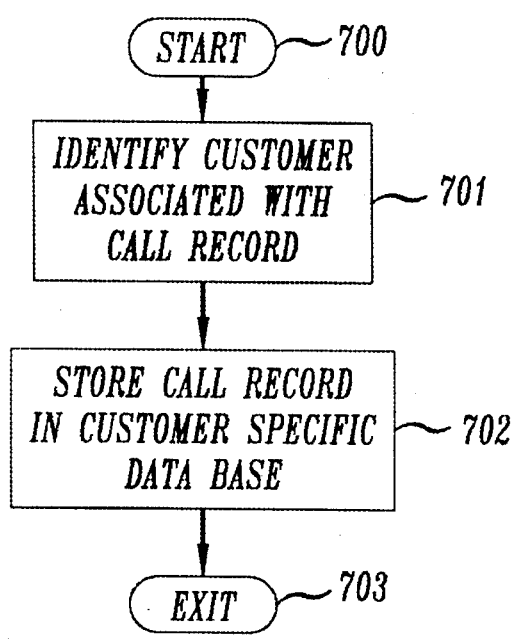

A flow chart of the AP processor program is shown in FIG. 6 and is entered upon receipt of a data record from a CP. When entered, the program proceeds to block 701 where it identifies the customer associated with the call record and then proceeds to block 702 where it stores the received record in a customer specific database that has been created for the customer in memory internal to the AP. The program then exits via block 703.

Figure 7:
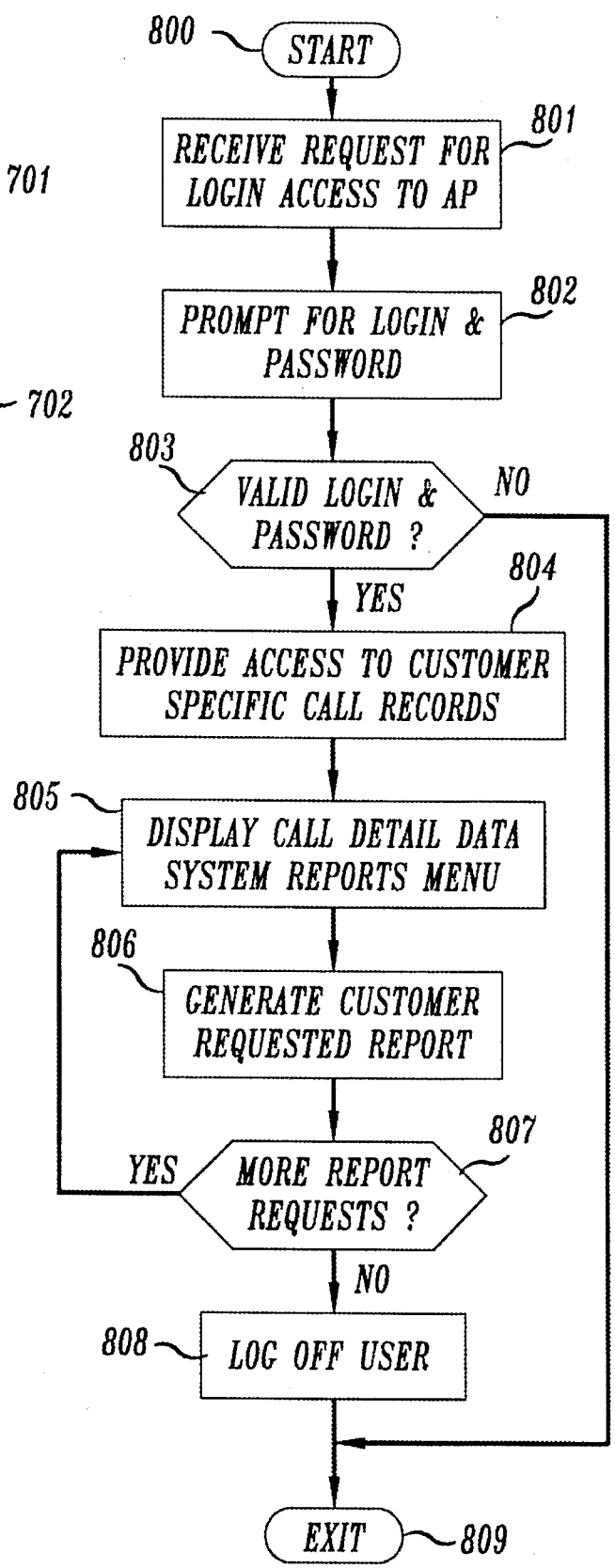

An AP interfaces with a customer via the program shown in FIG. 7, which is entered via blocks 800 and 801 upon receipt of a customer request. At block 802, the program in a conventional fashion prompts the customer to enter a "login", and proceeds to block 803 to determine if the entered login and an associated password are valid. If they are, then the program proceeds to block 804. Otherwise, the program exits via block 809. At block 804, the program translates the customer's login into a memory location indicative of the customer specific database. The program then proceeds to block 805 where it returns to the customer for display on terminal display a menu of various data options that the customer may select. Such options include, for example, call records search, call record summary, etc. If the customer selects a report summarizing the associated call records, then the AP transmits the report to the customer at block 806. Such a report summarizes, for example, the number of complete calls, number of incomplete calls, average call duration, calls to or from a particular location, etc. The program then proceeds to block 807 where it returns to block 805 if the customer enters a request for another report. If customer does not enter a request, then the program proceeds to block 808, where it waits for the customer to "logoff", and then exits via block 809 when the customer does so.

Figure 8:
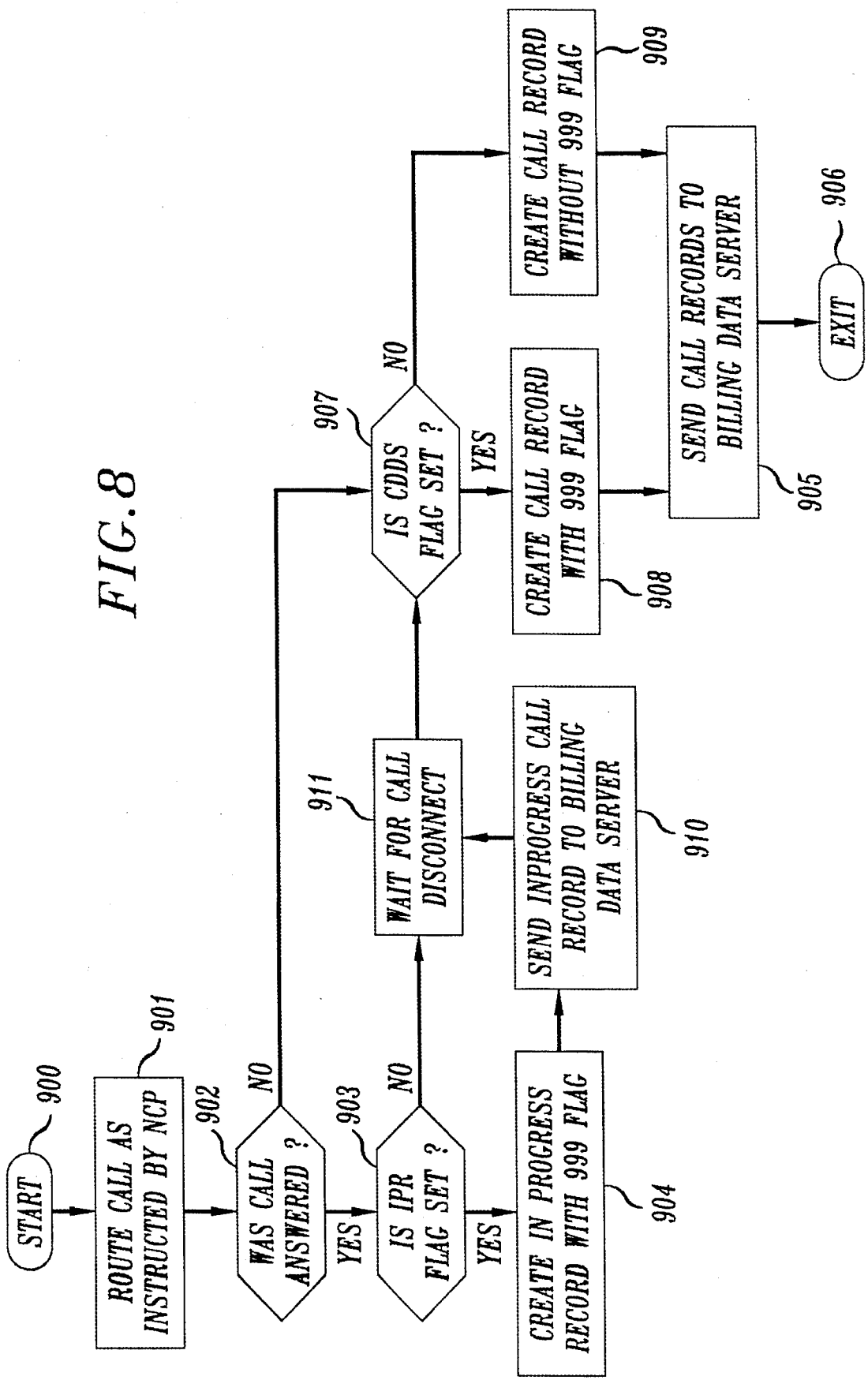

FIG. 8 shows in flow chart form the program which implements the principles of the invention in a toll switch, e.g., TS 105 (FIG. 1). Specifically, the program is entered at block 900 responsive to receipt of a call set-up message from an NCP, e.g., NCP 225. When so entered, the program proceeds to block 901 where, in conjunction with the regular call processing program, it causes the toll switch to route the call in accordance with the instructions contained in the NCP message (response). The program then proceeds to block 902, where it waits to see if the call is answered. If it is, then the program proceeds to block 903. Otherwise, the program proceeds to block 907. At block 903, the program checks the received NCP message to see if the aforementioned in-progress (second) flag is set. If it is, then the program proceeds to block 904. Otherwise, it proceeds to block 911.

At block 904, the program creates a copy of the call record and inserts 999 therein and then proceeds to block 910, where it sends the copy to its associated billing data server for delivery to CDDS 400. The program then proceeds to block 911, where it waits for the call to be terminated. When the call is terminated, then the program proceeds to block 907 where it checks the NCP response message to see if the CDDS routing flag is set. If it is, then the program proceeds to block 908 to complete the call record by setting the duration as appropriate and the CDDS field to 999. The program then proceeds to block 905. If the program, at block 907, finds that the CDDS flag is not set, then it proceeds to block 909 where it completes the call record with the duration field set as appropriate and without the 999 routing flag. The program then proceeds to block 905. At block 905, the program sends the call record to the billing data system and then exits via block 906.

The foregoing is merely illustrative of the principles of the invention. Those skilled in the art will be able to devise numerous arrangements, which, although not explicitly shown or described herein, nevertheless embody those principles that are within the spirit and scope of the invention. For example, although the invention was discussed in terms of an 800 service call, it is apparent that the invention may be used in conjunction with other type of calls (900 service, SDN service, etc.) including what is commonly referred to as Plain Old Telephone Service (POTS). For example, a billing data server may be readily adapted to sort records for particular POTS customers and send those records to an associated CDDS so that the POTS customers may access their respective call records on the fly. In addition, a CDDS may be readily adapted to provide automatic delivery of call records to respective customers. It is apparent from the foregoing that the functions provided by the billing data servers may be readily moved to respective toll switches or into the CDDS, thereby eliminating the need to provide such servers.

We claim:

1. A method of processing a billing record in a telecommunications system comprising the steps of responsive to receipt of a call placed by a caller, (a) sending a request to a centralized database requesting routing information indicative of the way in which said call is to be routed and (b) creating a call record to track details relating to said call, responsive to receipt of said routing information, directing said call toward its intended destination identified as a function of said routing information, responsive to said routing information including a predetermined indicator, inserting said indicator in said call record and sending said call record to a data server, at said data server, sending said call data record to a billing system if the associated call has been terminated and the call record contains a duration of time other than zero for the duration of the associated call, and responsive to said call record containing said indicator, storing a copy of the call record in a memory that may be accessed by a customer associated with the call record, in which said customer is located external to said telecommunications system.

2. The method set forth in claim 1 wherein said step of storing includes the step of delivering said call record when said call is completed.

3. The method set forth in claim 1 wherein said step of storing includes the step of delivering said call record during the progression of said call.

4. The method set forth in claim 1 wherein said step of storing includes the step of storing said call record in a database specific to said customer.

5. The method set forth in claim 4 wherein said step of storing includes the step of allowing said customer to access said database.

6. The method set forth in claim 1 wherein said step of storing includes the step of automatically supplying said call record via a datapath extending to data receiving facilities provided by said customer.

7. A method of processing a call in a telecommunications system comprising the steps of receiving a call from a caller and directing said call toward its destination, creating a call record associated with said call and inserting details relating to said call in said call record, said details including at least calling and called telephone numbers, forwarding said call to a destination identified from information derived as a function of said called telephone number, and thereafter sending said call record to a billing system and responsive to said call record containing a predetermined identifier included in said information, storing said call record in memory and allowing a customer associated with said call to access said stored call record from a location that is external to said telecommunications system.

8. The method set forth in claim 7 wherein said step of storing includes the step of delivering said call record when said call is completed.

9. The method set forth in claim 7 wherein said step of storing includes the step of delivering said call record during the progression of said call.

10. The method set forth in claim 7 wherein said step of creating includes the step of storing said call record in a database specific to said customer.

11. The method set forth in claim 10 wherein said step of storing includes the step of providing customer access to said database.

12. The method set forth in claim 1 wherein said step of storing includes the step of automatically supplying said call record via a datapath extending to said customer.

13. The method set forth in claim 1 wherein said step of receiving and forwarding includes the step of sending a request requesting routing information for said call to a centralized database and routing said call to a destination identified as a function of said information.

14. The method set forth in claim 13 wherein said call is received at an origination switch and forwarded to a destination switch and wherein said step of creating includes the steps of responsive to said information containing a predetermined indicator, sending a request to said destination switch requesting the identity of switching equipment used to forward said call from said destination switch to said intended destination, and responsive to receipt of said identity, including said identity in said call record.

* * * * *